US00RE42771E

(19) United States
(12) Reissued Patent
Lepperhoff et al.

(10) Patent Number: US RE42,771 E
(45) Date of Reissued Patent: Oct. 4, 2011

(54) METHOD OF OPERATION OF A DEVICE FOR ENERGY CONVERSION USING A MAIN FUEL AND AT LEAST ONE AUXILIARY FUEL

(75) Inventors: Gerhard Lepperhoff, Stolberg (DE); Helmut Pleimling, Overath (DE)

(73) Assignee: FEV Motorentechnik GmbH, Aachen (DE)

(21) Appl. No.: 12/429,624

(22) Filed: Apr. 24, 2009

Related U.S. Patent Documents

Reissue of:
(64) Patent No.: 7,207,318
Issued: Apr. 24, 2007
Appl. No.: 10/866,090
Filed: Jun. 14, 2004

U.S. Applications:
(63) Continuation of application No. PCT/EP02/12418, filed on Nov. 7, 2002.

(30) Foreign Application Priority Data

Dec. 14, 2001 (DE) ..... 101 61 449

(51) Int. Cl.

| | |
|---|---|
| ***F16K 31/20*** | (2006.01) |
| ***F16K 21/18*** | (2006.01) |
| ***F02M 51/00*** | (2006.01) |
| ***E03F 5/10*** | (2006.01) |
| ***F17D 1/00*** | (2006.01) |
| ***G05D 7/00*** | (2006.01) |
| ***G05D 11/00*** | (2006.01) |
| ***E03B 11/00*** | (2006.01) |
| ***G05D 9/00*** | (2006.01) |
| ***B60Q 1/00*** | (2006.01) |

(52) U.S. Cl. ..... 123/479; 123/491; 137/391; 137/396; 137/399; 137/571; 700/281; 700/282; 340/450.2

(58) Field of Classification Search ..... 123/437, 123/438, 472, 478–480, 491; 137/255, 263, 137/265, 386, 391, 392, 395, 396, 399, 413, 137/571; 700/281, 282; 702/55; 340/450, 340/450.2; 422/105, 106
See application file for complete search history.

(56) References Cited

U.S. PATENT DOCUMENTS

| | | | | |
|---|---|---|---|---|
| 3,710,809 | A | 1/1973 | Brown et al. | |
| 3,713,429 | A | 1/1973 | Dwyre | |
| 3,884,255 | A | 5/1975 | Merkle | |
| 3,967,549 | A * | 7/1976 | Thompson et al. | 347/125 |
| 4,119,061 | A | 10/1978 | Hoshi et al. | |
| 4,140,067 | A | 2/1979 | Jensen | |
| 4,194,396 | A * | 3/1980 | Ohsawa et al. | 73/311 |
| 4,445,470 | A | 5/1984 | Chmielewski | |
| 4,836,239 | A * | 6/1989 | Kinkead | 137/413 |
| 4,864,990 | A | 9/1989 | Tateishi et al. | |
| 4,960,088 | A * | 10/1990 | Havemann et al. | 123/198 D |
| 5,319,921 | A * | 6/1994 | Gopp | 60/274 |
| 5,519,638 | A * | 5/1996 | Tiao | 700/281 |
| 5,623,907 | A | 4/1997 | Cotton et al. | |
| 5,871,028 | A * | 2/1999 | Liu | 137/209 |
| 6,021,921 | A * | 2/2000 | Lan et al. | 222/61 |
| 6,068,672 | A | 5/2000 | Watson et al. | |
| 6,252,499 | B1 * | 6/2001 | Gerdtz et al. | 340/450.2 |
| 6,408,828 | B1 | 6/2002 | Wheeler | |
| 6,424,924 | B1 * | 7/2002 | Wagner et al. | 702/55 |
| 6,505,644 | B2 | 1/2003 | Coha et al. | |
| 6,553,974 | B1 | 4/2003 | Wickman et al. | |
| 6,584,997 | B1 | 7/2003 | Blichmann et al. | |
| 6,792,966 | B2 * | 9/2004 | Harvey | 137/265 |
| 2007/0178020 | A1 * | 8/2007 | Atlas et al. | 422/105 |

FOREIGN PATENT DOCUMENTS

| | | | |
|---|---|---|---|
| EP | 1146221 | A1 * | 10/2001 |
| EP | 1 158 148 | | 11/2001 |
| EP | 1 158 148 | A2 | 11/2001 |
| FR | 2 668 203 | | 4/1992 |
| FR | 2 668 203 | A1 | 4/1992 |
| FR | 2 790 223 | A1 | 9/2000 |
| FR | 2790223 | | 9/2000 |

OTHER PUBLICATIONS

International Search Report mailed Mar. 5, 2003 in corresponding International Application No. PCT/EP02/12418.

* cited by examiner

*Primary Examiner* — Crystal J Barnes-Bullock
(74) *Attorney, Agent, or Firm* — Venable LLP; Robert Kinberg; Steven J. Schwarz

(57) ABSTRACT

A method for operating a converter for the energy conversion of fuel from at least one main fuel supply, and from at least one auxiliary fuel supply for operating the converter directly and/or by operating an auxiliary unit, comprises: detecting the amount of fuel in the main fuel supply; detecting the amount of fuel in the auxiliary fuel supply, at least with respect to a predetermined minimum amount; in response to the minimum amount being reached, generating a signal that blocks at least one of a) filling of the main fuel supply, and b) startup of the converter via a control unit; and deactivating the blocking in response to the auxiliary fuel supply being replenished.

22 Claims, No Drawings

METHOD OF OPERATION OF A DEVICE FOR ENERGY CONVERSION USING A MAIN FUEL AND AT LEAST ONE AUXILIARY FUEL

Matter enclosed in heavy brackets [ ] appears in the original patent but forms no part of this reissue specification; matter printed in italics indicates the additions made by reissue.

CROSS-REFERENCE TO RELATED APPLICATION

This is a continuation of International Patent Application No. PCT/EP02/12418 filed Nov. 7, 2002, designating the United States and claiming priority of German Patent Application No. 101 61 449.7 filed Dec. 14, 2001, the disclosures of both foregoing applications being incorporated herein by reference.

BACKGROUND OF THE INVENTION

In addition to the main fuel, energy-conversion devices, or converters, such as internal combustion engines, also use auxiliary fuels during operation, for example, oil for lubrication and water for cooling. The use of lubricating oil and cooling water, however, is not tied directly to the fuel consumption and is generally very low. As a result, triggering a warning indicator is sufficient for refilling the fuel supply, depending on the time and, with vehicles, also depending on the distance.

Modern internal combustion engines, in particular, those used in motor vehicles, have auxiliary units that require a consumable auxiliary fuel supply for operation, wherein the operation of the auxiliary units is tied directly to the operation of the internal combustion engine. Auxiliary units of this type include, for example, exhaust-gas treatment systems, which are used to reduce nitrogen oxide emissions and to which additives for the exhaust-gas after treatment must be added, e.g. so-called selective catalytic reduction (SCR) catalysts supplemented with reducers. The auxiliary fuel amount to be supplied depends on the exhaust gas amount to be treated and, thus, for all practical purposes directly on the amount of the main fuel that is consumed.

A fuel cell, for example, can be considered to be an auxiliary unit for the autonomous energy supply for electric auxiliary units, wherein the fuel cell is supplied by an inserted hydrogen cartridge as fuel. The main fuel is, thus, used only for the operation of the internal combustion engine, while at least a portion of the electrical energy required for operating the auxiliary units can be generated by the autonomous electrical energy supply without stressing the environment. Such auxiliary units, operated via an autonomous electrical energy supply, advantageously include all auxiliary units that are not directly connected to the operation of the internal combustion engine, such as air-conditioning systems, window raising/lowering devices, communication means, and servo-units, e.g. for supporting the steering or the braking functions.

The respective remaining main and auxiliary fuel supplies, at least the reaching of a minimum fuel level, have so far been detected with sensors, and a corresponding warning signal generated.

For example, if the internal combustion engine comprises an exhaust-gas after-treatment device which requires a consumable fuel supply for an orderly operation, e.g. feeding a reduction means for a SCR catalyst, the internal combustion engine can still operate even if the fuel for the exhaust-gas after-treatment device is used up. The disadvantage, however, is that the operation then generates an impermissibly high amount of nitrogen oxide.

A fuel cell represents another application of an energy-conversion device, or converter. In the fuel cell, electrical current is generated through the electro-chemical conversion of a hydrogen-containing combustion gas as the main operating fuel in a reaction with another gas, such as air. An auxiliary fuel such as water, for example, is used for wetting the reaction gas and is needed to adjust a defined water content in the reaction air.

If the fuel cell functions as a main drive or as an auxiliary drive of a vehicle, a main fuel and an auxiliary fuel must respectively be carried along in separate reservoirs, in the same way as for the internal combustion engine.

Energy-conversion devices are henceforth simply referred to as converters, including the combustion engine mentioned as an exemplary embodiment for an energy-conversion device, and the fuel cell.

SUMMARY OF THE INVENTION

It is an object of this invention to create a method for operating an energy-conversion device for at least one main fuel that ensures an orderly operation if one or several of auxiliary fuels are running out.

This object is achieved with a proposed method for operating an energy-conversion device (converter) by means of a main fuel, wherein at least one tank containing at least one supply of main fuel is provided for operation, as is at least one auxiliary fuel supply that is required directly for the operation of the converter and/or for the operation of an auxiliary unit. This object is furthermore achieved in that the main fuel level is detected, that the auxiliary fuel level is detected at least with respect to a specified minimum level, that, once the minimum level for the auxiliary fuel has been reached, a signal is generated that blocks the filling of the main fuel supply and/or the startup of the converter with the aid of a control unit, and that this blocking is removed again once the auxiliary fuel supply has been replenished.

If during operation of the converter, enough auxiliary fuel is withdrawn from the supply via the auxiliary unit to reach a predetermined minimum level, and if the converter is then shut down, the restart of the converter is blocked via the control unit as a result of the signal triggered by the auxiliary fuel level sensor. This blocking is lifted only if the auxiliary fuel supply has been replenished. A device for stopping the refueling can be provided if the auxiliary fuel level sensor is linked to the main fuel level sensor. This stopping is lifted only if the auxiliary fuel supply has been replenished, so that the main fuel reservoir can subsequently be filled as well.

DETAILED DESCRIPTION OF THE INVENTION

The method is advantageously realized by a signal activating a control program in an operational control that permits only a capacity-limited and/or distance-limited and/or time-limited minimum operation. As a result, it is ensured that, if the level falls below the minimum auxiliary fuel level, the converter is still operational to a limited degree. This is particularly important for the internal combustion engine of a vehicle. The capacity limitation can be effected in an internal combustion engine, for example, by changing internal engine parameters, such as adjusting a fuel injection device with the goal of minimizing nitrogen oxide emissions. A distance limitation or a time limitation can respectively be preset via the operational control. It is particularly advantageous if the minimum operating level is limited by the existing residual fuel amount. It is advantageous to have a minimum operating level for a vehicle, for example, for maneuvering operations.

The limitation to a minimum operation, triggered via the operational control when a minimum auxiliary fuel level is reached, is intended to maintain operational safety to a limited degree, wherein this should nevertheless result in an orderly operation of the converter, supported by the respective auxiliary unit. If the predetermined minimum operational limit is reached, it is possible to adjust the control in such a way that the main fuel supply is shut down, which has the same result as a complete consumption of the main fuel supply, namely the shutdown of the converter.

Using the respective auxiliary fuel supply, e.g. a fuel cell, for operating an autonomous electrical supply system in a vehicle operated with an internal combustion engine only results in the disadvantage of reducing comfort, depending on the type of electrical auxiliary unit that is being supplied, for example, an air-conditioning unit, but does not necessitate a direct intervention in the internal combustion engine operation.

However, if the electrical auxiliary unit is used for operating the steering and/or brakes on a vehicle operated with an internal combustion engine, the failure of the autonomous electrical energy supply directly affects the operation of the vehicle, thereby necessitating an intervention in the engine operation via the control unit. This can be done by activating a speed limitation, which permits only a maximum vehicle speed that is matched to the more difficult operation of steering and/or brakes and ensures that the vehicle can be driven safely.

It makes sense if an advance warning signal is sounded before the specified minimum level is reached, which then triggers a further warning signal.

A different embodiment of the method according to the invention provides that the respective remaining amounts of the main fuel and the auxiliary fuel are detected, and that the resulting actual fuel amount ratio of the main fuel to the auxiliary fuel is determined and is then compared to a specified permissible range for the fuel amount ratio.

Following this, the maximum permissible refill amount for the main fuel and/or the auxiliary fuel is indicated and/or a blocking signal triggered if the levels have fallen below a specified fuel amount ratio. The specified fuel amount ratio can be preset as an empirically determined, design-related value in the auxiliary unit control unit and/or in the engine control unit. Thus, the main fuel amount, the auxiliary fuel amount and the related links can be computed with corresponding calculations and indicated as an amount ratio via a variance comparison. Thus, the user can also feed fuel in limited amounts during the operation, depending on the prevailing conditions.

While the auxiliary fuels for the auxiliary units, for example, reduction means for the exhaust-gas after treatment devices or hydrogen for a fuel cell, are supplied in the form of ready-made units, e.g. cartridges which cannot be refilled separately but contain predetermined amounts, this embodiment provides the user with the option of refilling only a limited amount of main fuel, depending on the indicated level.

However, if the auxiliary fuel supply differs only minimally from the predetermined minimum amount at the time when the main fuel is refilled and if subsequently the main fuel tank is refilled, then the main fuel supply will certainly exceed the possible operating time based on the existing auxiliary fuel amount. The blocking signal is then triggered and, following the main fuel tank refilling, the converter can be started only if the auxiliary fuel tank is filled and/or a new cartridge has been inserted.

The blocking of the starter can be triggered in different ways. One option according to the invention is the activation of an electronic vehicle immobilization device, meaning that an orderly turning of the ignition key will not start the converter and, thus, also not start the internal combustion engine of the vehicle. However, an associated signal will light up.

According to a different embodiment, filling of the tank can be blocked, for example, mechanically with a locking bolt on the lid of the fuel-filling tube or by locking the fuel-tank flap on the automobile body.

With auxiliary fuels for which the use depends on the use of the main fuel, e.g. reduction means for an exhaust-gas after treatment device, the arrangement generally is configured such that the maximum auxiliary fuel supply is matched to a maximum main fuel supply, so that it can be assumed in principle that the auxiliary fuel supply is used up at the same time as the main fuel supply, which is predetermined by the tank size, so that new auxiliary fuel must be supplied with practically each filling of the main fuel tank. However, the arrangement can also be modified such that a maximum amount of auxiliary fuel is sufficient for n-times the maximum amount of main fuel, so that the auxiliary fuel supply must be replenished, for example, after two or three main fuel tank fillings. The auxiliary unit supply in the same way can also be configured such that a reserve is held in store and that, instead of triggering a blocking signal once the auxiliary fuel level falls below the minimum amount, the supply is switched to the reserve reservoir.

Fuels, meaning the main fuel as well as the auxiliary fuels, can also be used in the form of a mixture of at least two material components, wherein the material components can be supplied individually and the mixture then created on site, meaning inside the storage container. This is possible, for example, with a urea-hydrogen solution as a reducing agent for reducing $NO_x$ levels. For realizing the method according to the invention, the mixture ratio is advantageously detected and the blocking signal triggered if this ratio deviates from the predetermined mixture ratio, thus preventing a startup of the internal combustion engine. One example for this is when water only is used for adjusting the specified amount during the replenishing of a urea-hydrogen supply as reduction means while the predetermined mixture ratio is not observed. The non-problematic operation of the exhaust-gas after treatment unit is thus ensured, insofar as it depends on an orderly auxiliary fuel admixture. The aforementioned treatment step, however, is not limited to the application case presented as example.

The above-described links for detecting the amounts are not limited to one auxiliary fuel. Thus, with an internal combustion engine used in a vehicle, the auxiliary fuel required for the exhaust-gas after treatment unit, as well as the auxiliary fuel needed for an autonomous electrical energy supply, can be linked to the detection of the main fuel supply in such a way that, once a specified minimum amount is reached for one of the two fuels, corresponding signals are triggered and the control unit and/or the engine control are actuated, which then triggers corresponding control signals.

The respective amounts can be detected continuously or at predetermined time intervals, wherein the respective amounts should be detected simultaneously. The length of these intervals can change. Starting with maximum amounts for the main fuel and the respective auxiliary fuel (s), the levels can be detected following long time-dependent or distance-dependent intervals. These detection intervals become shorter as the minimum amounts of the fuels are approached, such that the minimum amounts can be detected as precisely as possible.

A tachograph is required for commercial-use vehicles, for example trucks or buses, for which a tachograph recording sheet must be replaced and controlled regularly. It makes sense in that case if, at least as the minimum amount of one or even several of the fuels is approached, the amount is recorded on the tachograph page, so that the fuel supply can be checked during the daily control of the tachograph.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for operating a converter for the energy conversion of fuel from at least one main fuel supply, and from at least one auxiliary fuel supply for operating the converter directly and/or by operating an auxiliary unit, comprising:

detecting the amount of fuel in the main fuel supply;

detecting the amount of fuel in the auxiliary fuel supply, at least with respect to a predetermined minimum amount;

in response to the minimum amount being reached, generating a signal that blocks at least one of a) filling of the main fuel supply, and b) startup of the converter via a control unit; and deactivating the blocking in response to the auxiliary fuel supply being replenished.

2. The method according to claim 1, wherein the signal activates a control program in a control unit, whereby only a minimum operation that is limited in at least one of capacity, distance and time is permitted.

3. The method according to claim 2, wherein the minimum operation is limited by the existing residual amount of fuel in the auxiliary fuel supply.

4. The method according to claim 1, wherein, before the minimum amount is reached, an advance signal is generated which then triggers a warning signal.

5. The method according to claim 1, further comprising determining an actual amount fuel ratio of the amounts of fuel in the main and auxiliary fuel supplies detected in the detecting steps;

comparing the actual amount fuel ratio to a predetermined permissible range for the fuel amount ratio; and if the value for the actual amount fuel ratio is below the predetermined ratio, performing at least one of the steps of a) indicating the maximum permissible refill amount for at least one of the main fuel and the auxiliary fuel, and b) triggering the blocking signal.

6. The method according to claim 1, wherein the step of generating a signal comprises blocking startup of the converter by activation of an electronic immobilization device.

7. The method according to claim 1, wherein the converter is installed in a vehicle, and the step of generating a signal comprises activating a lock preventing filling of the main fuel supply.

8. The method according to claim 7, wherein the converter is an internal combustion engine.

9. The method according to claim 1, wherein the auxiliary fuel supply operates an exhaust-gas after treatment unit.

10. The method according to claim 1, wherein the auxiliary fuel supply operates a fuel cell for the autonomous electrical supply of auxiliary units.

11. The method according to claim 1, wherein the detected amount of fuel in the auxiliary fuel supply is at least one of indicated and recorded.

12. The method according to claim 1, wherein the respective amounts of fuel in the main fuel supply and the auxiliary fuel supply are detected simultaneously at intervals.

13. The method according to claim 1, wherein the fuel in the auxiliary fuel supply comprises at least two material components that can be supplied individually to the auxiliary fuel supply, the mixing ratio of the material components is detected, and the blocking signal is generated in response to deviations of the mixing ratio from a predetermined mixing ratio.

*14. A method for operating a converter for the energy conversion of fuel from at least one main fuel supply, and from at least one auxiliary fuel supply for operating the converter directly and/or for operating an auxiliary unit, comprising: detecting the amount of fuel in the main fuel supply; detecting the amount of fuel in the auxiliary fuel supply, at least with respect to a predetermined minimum amount; in response to the predetermined minimum amount being reached, generating a signal to activate a control program in a control unit to permit only a minimum operation, which is limited in at least one of capacity, distance, and time; and deactivating generation of the signal in response to the auxiliary fuel supply being replenished above the predetermined minimum amount.*

*15. The method according to claim 14, further comprising limiting the minimum operation based on the amount of fuel in the auxiliary fuel supply.*

*16. The method according to claim 14, further comprising generating an advance signal that triggers a warning signal before the predetermined minimum amount is reached.*

*17. The method according to claim 14, wherein the converter is an internal combustion engine.*

*18. The method according to claim 14, wherein the auxiliary fuel supply operates an exhaust-gas after treatment unit.*

*19. The method according to claim 14, wherein the auxiliary fuel supply operates a fuel cell for the autonomous electrical supply of auxiliary units.*

*20. The method according to claim 14, further comprising indicating or recording the amount of fuel that is detected in the auxiliary fuel supply.*

*21. The method according to claim 14, wherein the respective amounts of fuel in the main fuel supply and the auxiliary fuel supply are detected simultaneously at intervals.*

*22. The method according to claim 14, wherein the fuel in the auxiliary fuel supply comprises at least two material components that can be supplied individually to the auxiliary fuel supply, the method further comprising: detecting a mixing ratio of the material components, and generating the signal to activate the control program in response to deviations of the mixing ratio from a predetermined mixing ratio.*

* * * * *